July 27, 1937.  J. A. V. TURCK  2,088,004
MOTOR GOVERNOR
Filed Oct. 22, 1932
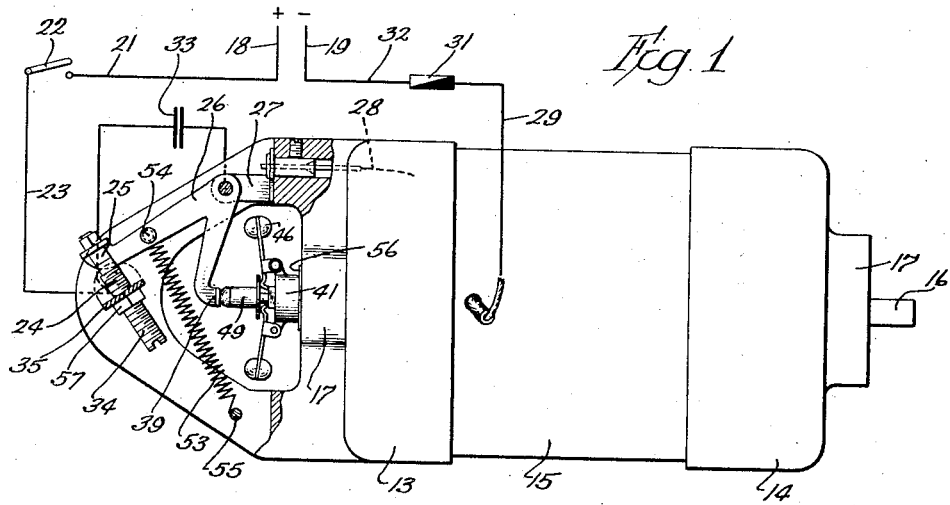
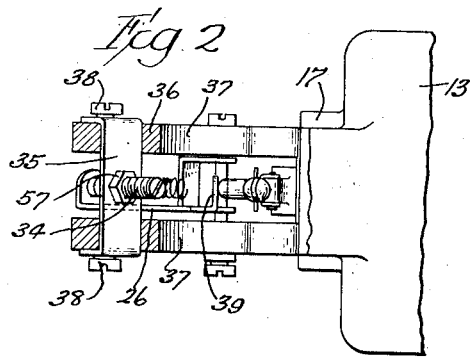
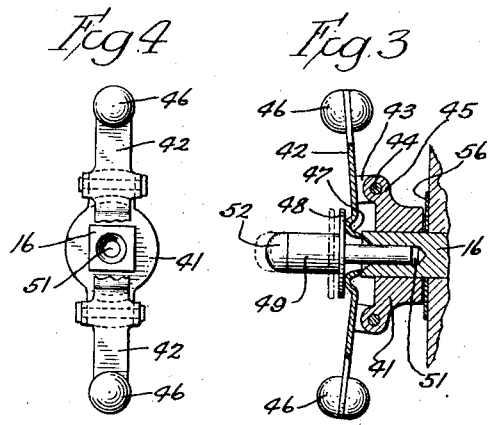
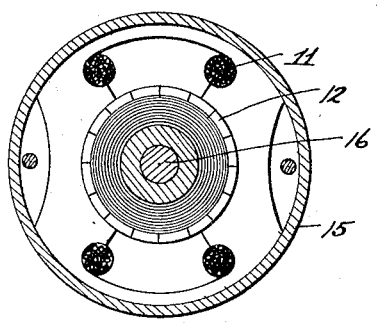
Inventor:
Joseph A. V. Turck
John C. Carpenter
Atty.

Patented July 27, 1937

2,088,004

UNITED STATES PATENT OFFICE 2,088,004

MOTOR GOVERNOR

Joseph A. V. Turck, Chicago, Ill., assignor to Felt & Tarrant Manufacturing Company, Chicago, Ill., a corporation of Illinois Application October 22, 1932, Serial No. 639,021

14 Claims. (Cl. 200—80)

This invention relates to electric motors and has for its object the provision of an improved sensitive speed control. Prior to the instant invention considerable difficulty has been experienced in the provision of sensitive speed controls for electric motors, partly because of axial play usually permitted to rotor or armature shaft, which is thought desirable to best operation of the motor.

Generally the control of the motor speed has heretofore been accomplished by resistance devices operable to increase the resistance upon excessive speed. For many motor uses such speed control is undesirable because of the heat produced in the passage of the current through the resistance coils.

The instant invention has for an object the provision of a sensitive make and break device and governor for it, the governing actions of which will at all times be free of influence of axial movement of the armature and its shaft.

The invention contemplates attainment of this result through the provision of a centrifugal governor of simple construction mounted for rotation upon the armature shaft but restrained against axial movement with the shaft and through the mounting of the make and break device and the governor in a rigid unitary housing part integral with or forming a part of the motor housing.

Another important object of the invention is the provision of a motor control of the character described, which may readily be adjusted to vary the maximum speed control of the governor.

Numerous other objects and advantages of the invention will be understood from the following description, which, when taken in connection with the accompanying drawing, discloses a preferred embodiment thereof.

On the drawing,

Figure 1 is a side elevation, parts being broken away, of an electric motor equipped with the present invention;

Fig. 2 is a partial bottom plan view of Fig. 1, parts being shown in section to disclose certain features of construction;

Fig. 3 is an enlarged section through the centrifugal device and showing its position upon the end of the armature shaft;

Fig. 4 is a view looking from the left at Fig. 3, parts of the centrifugal governor being omitted; and Fig. 5 is a section through the motor showing the casing, the field, and the armature shaft.

The electric motor shown on the drawing comprises a stationary field 11 and a rotatable armature 12. The armature and field are mounted within a casing comprising end units 13 and 14 and a central housing unit 15, and a shaft 16 which is fixed for rotation with the armature in the end units 13 and 14 in which it has bearing at 17.

Current is supplied to the field from power lines 18 and 19 through a circuit to be now described. A wire 21 leads from wire 18 to a switch 22 for starting and stopping the motor. From switch 22 a wire 23 leads to one terminal or contact 24 of a make and break device which, as will be later explained, is motor controlled. The other terminal or contact 25 of the make and break device is carried in electrical contact by a bell crank lever 26 which is pivotally mounted in a bracket 27 fixed on the casing unit 13 and this bracket is electrically connected to a lead-in wire 28 of the field. The circuit is completed by a wire 29 leading to a fuse 31 and a wire 32 connecting the fuse 31 with the line wire 19. A fixed condenser 33 is or may be placed in parallel with the lever 26 as illustrated in Fig. 1.

The terminal or contact 24 of the make and break device is provided upon the end of a screw 34 threaded through a shelf 35 arranged through openings 36 in two rigid bracket arms 37 forming a part of the casing unit 13. The ends of the shelf 35 are turned up outside the arms 37 and bolts 38 pass through the upturned ends of the shelf to hold the shelf rigidly in position.

As has been stated, one arm of the bell crank lever 26 carries one contact 25 of the make and break contacts or terminals adapted for engagement with the companion terminal or contact 24. The other arm of the bell crank lever is arranged in registration with the axis of the armature shaft 16 and is provided with a lip 39 arranged for engagement by a centrifugal or ball governor carried on the end of the shaft. The end of the shaft is preferably square and fits into a companion shaft receiving opening in the body 41 of the governor so that the body is compelled to rotate with the shaft.

Two ball or centrifugal levers 42 are pivoted to the body and extend on opposite sides of the central axis. Each lever 42 is provided with parallelly extending arms 43 pivoted upon a pivot pin 44 arranged through a lug 45 of the body. The outer end of each lever 42 is provided with a weight or ball 46 adapted to be moved to the right (viewing Fig. 3) as the speed of the motor increases. The inner end 47 of each lever 42 is arranged behind a shoulder 48 of a governor pin 49 which slidably extends into a bore 51 provided in the end of the armature shaft 16. The outer end 52 of the governor pin is rounded and arranged in engagement with the lip 39 of the bell crank lever 26.

A spring 53 fixed at one end at 54 to the bell crank lever 26 and at the other end at 55 to the housing unit 13 acts to pull the terminal 25 of the make and break device into contact with its companion terminal 24 and cause the lip 39 to press the governor pin toward the shaft end and swing the governor levers 42 to the position shown in Fig. 3, the ends 47 of the governor levers in this position engaging the end of the shaft 16. A washer 56 is positioned between the governor body 41 and the adjacent wall of the casing unit 13.

From the foregoing it will be apparent that the position of the governor levers and governor movement of the bell crank lever 26 is independent of the axial movement of the shaft 16 since this shaft has mere sliding engagement within its bearing within the governor body 41 and with respect to the governor pin 52. The spring 53 presses the governor body 41 against the washer 56 and this washer against the casing unit 13.

As the motor speeds up centrifugal force created by rotation of the weighted or ball ends 46 of the levers 42 causes these levers to move the governor pin 52 to the left to separate the terminals 24 and 25 of the make and break devices as soon as the motor exceeds predetermined speed. The speed at which the make and break device opens can be readily adjusted and determined by manipulation of the screw 34. A locking nut 57 is provided to hold these parts in their adjusted relation.

In the operation of the control the speed of the motor is maintained substantially constant and the contacts 24 and 25 continually open and close as the motor exceeds or slows beneath the predetermined speed. The control is sensitive and is unaffected by movement of the shaft 16 axially as the armature rotates.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In an electric motor having an armature shaft, separable members contacting to complete a circuit of said motor, a centrifugal device mounted upon the armature shaft of the motor for rotation therewith and held against axial movement with said shaft, and a device controlling contact of said members in turn controlled by said centrifugal device.

2. In an electric motor, having a rotatable armature, a make and break contact device located in a circuit of said motor, and a centrifugal governor controlling the action of said make and break contact device rotatable with said armature and restrained against axial movement with said armature.

3. In an electric motor having a rotatable armature, a make and break contact device located in a circuit of said motor, a centrifugal governor controlling the action of said make and break contact device rotatable with said armature and restrained against axial movement with said armature, and means altering the action of said make and break contact device under the control of said governor.

4. In an electric motor having a rotatable armature and armature shaft and a housing, a make and break contact device for controlling a circuit of said motor, a lever pivoted in the housing for actuating said contact device, said lever having an end arranged in axial registration with the armature shaft, a centrifugal governor mounted upon an end of said shaft for engagement with said lever and keyed for conjoint rotation with said shaft, and spring means urging said governor against a housing part to prevent axial movement of said governor as the shaft moves axially in the operation of the motor.

5. In an electric motor having a rotatable armature and armature shaft, a make and break contact device for controlling a circuit of said motor, and a centrifugal governor controlling said make and break contact device to interrupt the motor circuit when the armature reaches predetermined speed, said centrifugal governor being rotatable with said armature and restrained against axial movement with said armature.

6. In an electric motor having a rotatable armature and armature shaft, a make and break contact device for controlling a circuit of said motor, a centrifugal governor controlling the action of said make and break contact device rotatable with said armature and restrained against axial movement with said armature, and a motor casing, said make and break contact device and said centrifugal governor being mounted within the motor casing as a unit.

7. In an electric motor, a casing, a rotor shaft journaled in said casing, a make and break contact device carried by said casing for controlling a circuit of the motor, and a centrifugal governor for controlling the operation of said contact device, said governor being mounted on said shaft for rotation therewith and restrained against axial movement with said shaft.

8. In an electric motor, a casing, a rotor shaft journaled in said casing, a make and break contact device carried by said casing for controlling a circuit of the motor, a centrifugal governor for controlling the operation of said contact device, said governor being mounted on said shaft for rotation therewith and restrained against axial movement with said shaft, and means for adjusting said contact device to operate at varying rotor speeds.

9. In an electric motor, a casing, a rotor shaft journaled in said casing, a make and break contact device carried by said casing for controlling a circuit of the motor, a member carried by said shaft and movable axially thereof for actuating said contact device, and a centrifugal governor mounted on said shaft for rotation therewith and restrained against axial movement with said shaft, said governor being operable when said rotor reaches a predetermined speed of rotation, to move said member axially of said shaft thus to cause said contact device to open said circuit.

10. In an electric motor, a casing, a rotor shaft journaled in said casing and having an axial bore in one end thereof, a fixed contact carried by said casing and included in the circuit of said motor, a movable contact co-operating therewith, a pin mounted for axial floating movement in said bore for actuating said movable contact to open said circuit, and a centrifugal governor for actuating said pin when said rotor reaches a predetermined speed of rotation, said governor being mounted on said shaft for rotation therewith and restrained against axial movement with said shaft.

11. In an electric motor, a casing, a rotor shaft journaled in said casing, a fixed contact carried by said casing and included in the circuit of said motor, a movable contact co-operating therewith, means for yieldably urging said movable contact toward said fixed contact, a member carried by said shaft and movable axially relatively thereto for actuating said movable contact to open said circuit, and a centrifugal governor for controlling the operation of said member to open said circuit against the action of said yieldable means when said rotor reaches a predetermined speed of rotation, said governor being mounted on said shaft for rotation therewith and restrained against axial movement with said shaft.

12. In an electric motor, a casing, a rotor shaft journaled in said casing, a fixed contact carried by said casing and included in the circuit of said motor, a movable contact co-operating therewith, a spring for urging said movable contact into engagement with said fixed contact, a member carried by said shaft and movable axially relatively thereto for actuating said movable contact to open said circuit, a centrifugal governor for controlling the operation of said member to open said circuit when said shaft reaches a predetermined speed of rotation, said governor being mounted on said shaft for rotation therewith and restrained against axial movement with said shaft, and means for adjusting said fixed contact relative to said movable contact so as to vary the tension of said spring and thus cause said movable contact to operate at varying rotor speeds.

13. In an electric motor having a casing and a rotatable armature shaft mounted in said casing for limited axial movement relative thereto, a make and break contact device located in a circuit of said motor, a centrifugal governor for controlling the action of said make and break contact device, comprising a main body portion slidably mounted on said shaft exteriorly of said casing and adapted to rotate with said shaft, and means for resiliently maintaining said body portion against said casing to restrain said governor against axial movement with said shaft.

14. In an electric motor having a casing and a rotatable armature shaft mounted in said casing for limited axial movement relative thereto, a make and break contact device located in a circuit of said motor, a centrifugal governor for controlling the action of said make and break contact device, comprising a main body portion slidably mounted on said shaft exteriorly of said casing and adapted to rotate with said shaft, and a pair of levers having weights secured to their outer ends pivotally mounted on said body portion, and means engaging the inner ends of said levers for resiliently maintaining the body portion of said governor in contact with said casing to prevent axial movement of said body portion with said shaft relative to said casing.

JOSEPH A. V. TURCK.